US 9,907,377 B2

(12) United States Patent
Mercado

(10) Patent No.: US 9,907,377 B2
(45) Date of Patent: *Mar. 6, 2018

(54) SECURITY SYSTEM FOR TRACKING MOVABLE OBJECTS

(71) Applicant: AKQYS IP, LLC, Orlando, FL (US)

(72) Inventor: Felix C. Mercado, Orlando, FL (US)

(73) Assignee: AKQYS IP, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,155

(22) Filed: Mar. 24, 2017

(65) Prior Publication Data

US 2017/0188680 A1 Jul. 6, 2017

Related U.S. Application Data

(63) Continuation of application No. 14/546,551, filed on Nov. 18, 2014, now Pat. No. 9,609,932.

(60) Provisional application No. 61/906,691, filed on Nov. 20, 2013.

(51) Int. Cl.
| | |
|---|---|
| *G08B 13/08* | (2006.01) |
| *A45C 13/18* | (2006.01) |
| *G08B 13/196* | (2006.01) |
| *H04N 7/18* | (2006.01) |
| *G01S 19/16* | (2010.01) |
| *G06Q 10/08* | (2012.01) |

(52) U.S. Cl.
CPC ............. *A45C 13/18* (2013.01); *G01S 19/16* (2013.01); *G06Q 10/0833* (2013.01); *G08B 13/1966* (2013.01); *G08B 13/19671* (2013.01); *H04N 7/181* (2013.01); *H04N 7/188* (2013.01)

(58) Field of Classification Search
CPC ........ H04N 7/18; H04N 5/225; H04N 5/2341; G08B 13/19619; G08B 13/19695
USPC ....................................................... 340/545.6
See application file for complete search history.

(56) References Cited

U.S. PATENT DOCUMENTS

| | | | |
|---|---|---|---|
| 5,963,131 A | 10/1999 | D'Angelo et al. | |
| 8,558,660 B2 * | 10/2013 | Nix .......................... | H04Q 9/00 340/10.1 |
| 8,964,037 B2 | 2/2015 | Petricoin, Jr. | |
| 9,026,046 B2 * | 5/2015 | Lefley ..................... | H02J 17/00 455/102 |
| 2002/0057915 A1 | 5/2002 | Mann | |

(Continued)

*Primary Examiner* — Eric M Blount
(74) *Attorney, Agent, or Firm* — David M. Quinlan, P.C.

(57) ABSTRACT

A luggage tracking and surveillance system uses a zipper pull attached to a conventional suitcase closure zipper and a retaining fastener attached to conventional fastening straps securing contents inside the suitcase. An observer is not aware of the specially designed zipper pull and retaining fastener because they mimic the appearance of their conventional counterparts. The external zipper pull communicates wirelessly with the retaining fastener inside the suitcase when a zipper pull touch sensor senses that the suitcase has been opened. This awakens a retainer fastener power supply and activates a recording system in the fastener to create a record of the person who opened the suitcase. The retaining fastener can also sense the presence of a human and independently activate the recording system. Recorded still pictures, video, and audio, along with location information supplied by GPS circuitry in the zipper pull and/or retaining fastener, are transmitted to a remote database.

31 Claims, 6 Drawing Sheets

(56) References Cited

U.S. PATENT DOCUMENTS

| | | | |
|---|---|---|---|
| 2009/0072988 A1 | 3/2009 | Haywood | |
| 2012/0075139 A1* | 3/2012 | Gagnon | G01S 19/48 |
| | | | 342/357.29 |
| 2012/0186926 A1 | 7/2012 | Sheikh | |
| 2012/0299721 A1* | 11/2012 | Jones | B60R 25/33 |
| | | | 340/521 |
| 2013/0057694 A1* | 3/2013 | Petricoin, Jr. | H04N 7/18 |
| | | | 348/155 |
| 2014/0002239 A1 | 1/2014 | Rayner | |
| 2014/0281628 A1* | 9/2014 | Nigam | G06F 1/3206 |
| | | | 713/323 |

* cited by examiner

SECURITY SYSTEM FOR TRACKING MOVABLE OBJECTS

CROSS-REFERENCE TO RELATED APPLICATIONS

This application claims benefit of U.S. application Ser. No. 14/546,551, filed on Nov. 18, 2014, which in turn claims benefit of U.S. application Ser. No. 61/906,691, filed Nov. 20, 2013. The entire contents of applications Ser. No. 14/546,551 and No. 61/906,691 are incorporated by reference in the present application.

BACKGROUND OF THE INVENTION

1. Field of the Invention

This invention relates, generally, to security and tracking systems. More specifically, it relates to discreet luggage tracking and surveillance devices.

2. Brief Description of the Prior Art

Checked luggage is a multi-billion dollar industry and yet 26 million pieces of luggage go missing every year. Recent increased security measures prevent travelers from locking their luggage when using various transportation ports, such as airports. When traveling through these transportation ports luggage is regularly searched by unknown security personnel and too often valuables become lost or stolen.

Many searches are conducted in closed rooms lacking video surveillance making it nearly impossible to identify the perpetrator. Additionally an owner may be unaware that his/her valuables have been stolen until it is too late because of the extended period of separation between owner and luggage and the hectic nature of traveling. Recovering stolen valuables and identifying perpetrators has become extremely difficult.

Accordingly, what is needed is a simple means for adapting luggage with an effective security system to aid in locating an individual's luggage and providing evidence of the identity of the perpetrator. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, this in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this description, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION OF THE DRAWINGS

For a fuller understanding of the invention, reference should be made to the following detailed description, taken in connection with the accompanying drawings, in which.

DETAILED DESCRIPTION OF PREFERRED EMBODIMENTS

Figure 1:
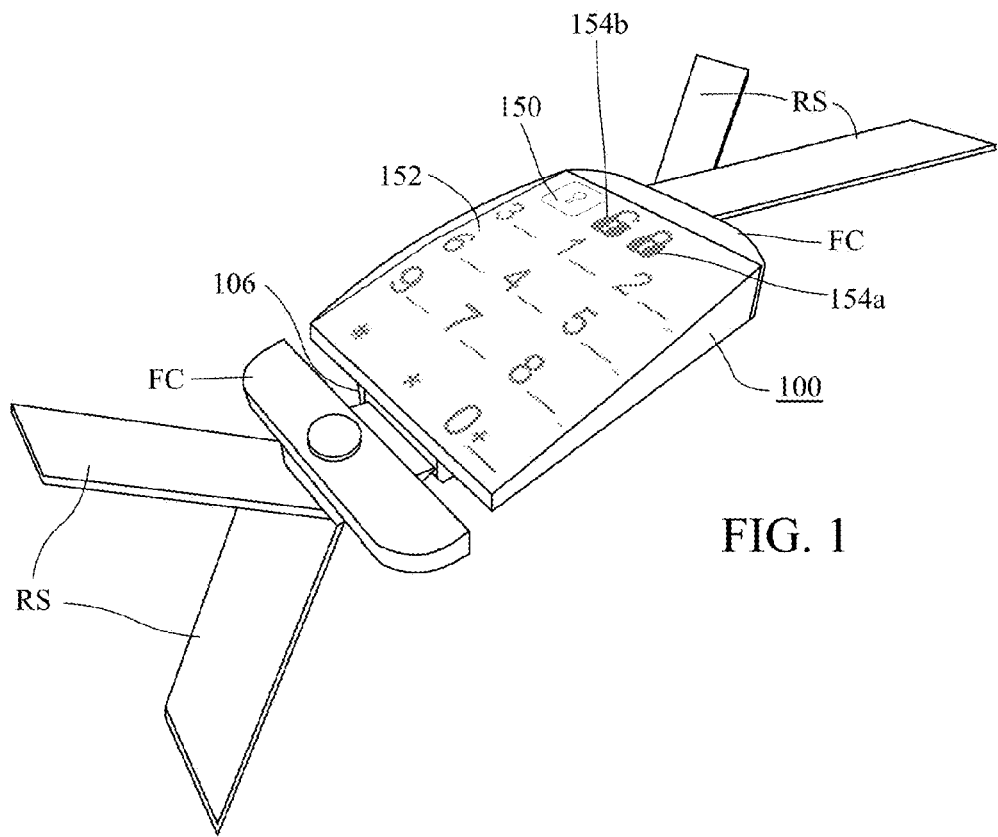
FIG. 1 is a perspective view of a retaining fastener according to an embodiment of the luggage security system described herein.
Figure 2:
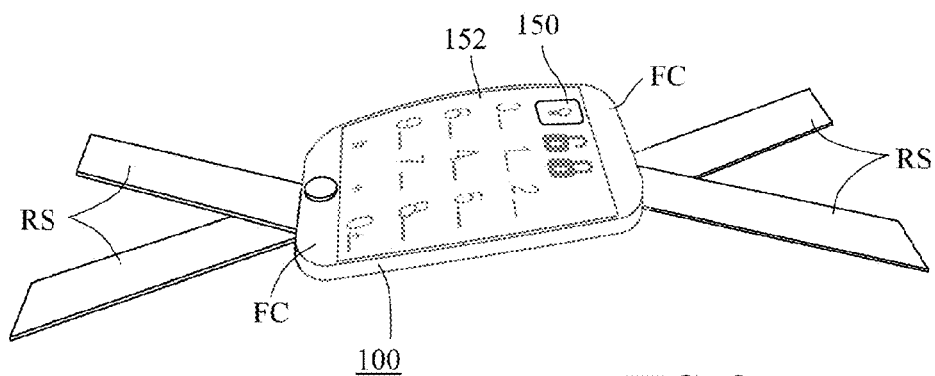
FIG. 2 is a perspective view of the retaining fastener in FIG. 1 attached to internal luggage retaining straps.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may he made without departing from the scope of the invention.

The present invention is a discreet luggage tracking and surveillance system having in the present embodiment a replaceable interior retaining fastener 100 (see FIGS. 1 to 4) and a zipper pull 200 (see FIGS. 5 to 7), which are capable of communicating with each other and transmitting data in a manner known by a person having ordinary skill in the art. The zipper pull 200 has an aesthetic design generally similar to that of existing luggage zipper pulls such that a thief would be unaware that the zipper pull 200 is anything other than a simple structure providing a user with a handle to aid in pulling open a conventional zipper Z to gain access to the interior of the piece of luggage. The zipper pull of the present embodiment contains a fastener, such as the removable hook ring 202, so that it can be easily attached to the existing zipper structure Z when the existing zipper pull (not shown in the drawings) has been removed.

Figure 5:
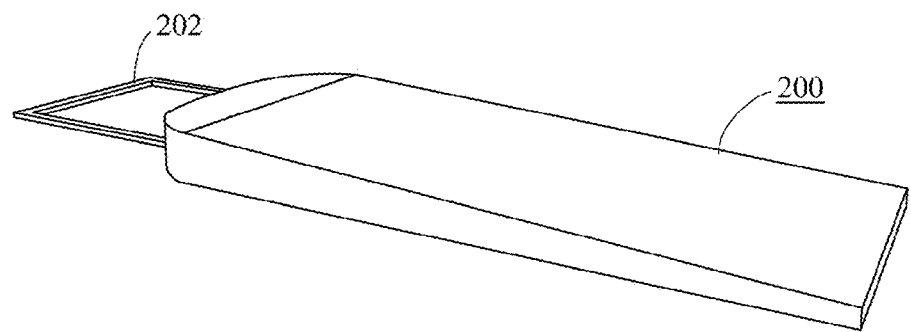
FIG. 5 is a perspective view of a luggage zipper pull according to an embodiment of the luggage security system.
Figure 6:
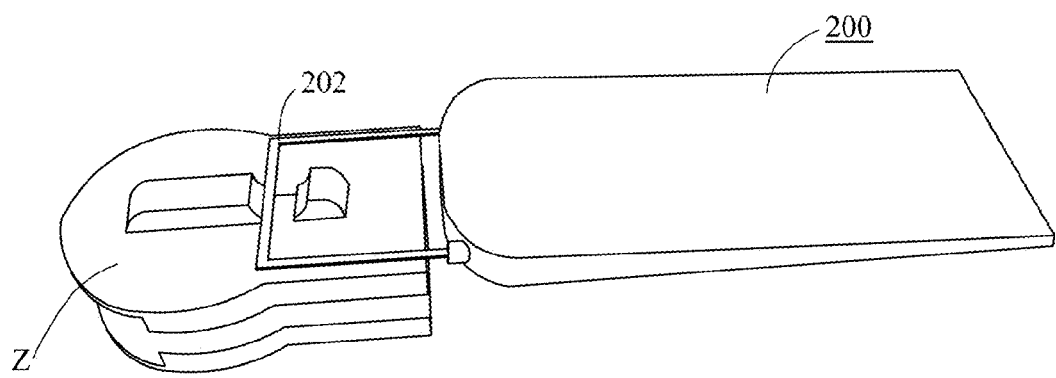
FIG. 6 is a perspective view of the zipper pull in FIG. 5 showing how it attaches to a zipper on an item of luggage incorporating the luggage security system described herein.
Figure 7:
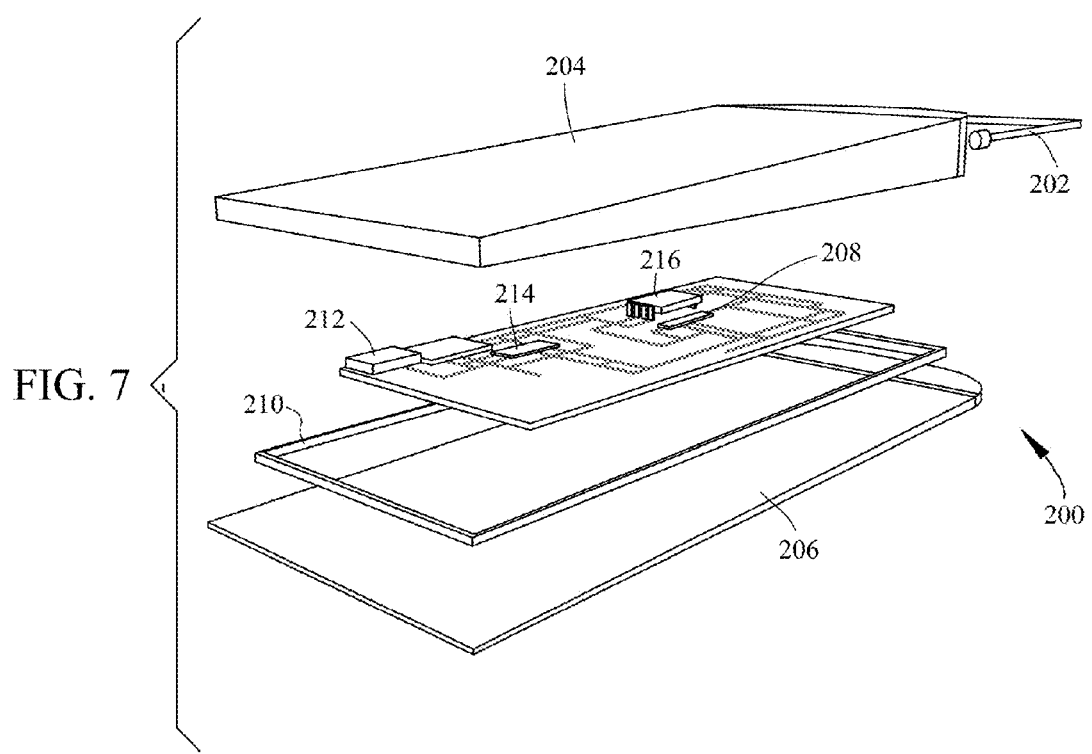
FIG. 7 is an exploded view of the zipper pull in FIG. 5.

As seen in FIG. 7, the zipper pull 200 has a top casing member 204 and a lower casing member 206 which are secured together to form a housing (see FIGS. 5 and 6). The zipper pull housing encloses various components to effect operation as described herein. The housing encloses a touch sensor/controller 208 that senses when the zipper pull has been touched by a human. The housing also encloses an antenna 210, a power supply system 212, GPS circuitry 214, and a microcontroller 216. The zipper pull components provide a system for communicating with the retaining fastener 100. The zipper pull can also transmit GPS information.

Figure 3:
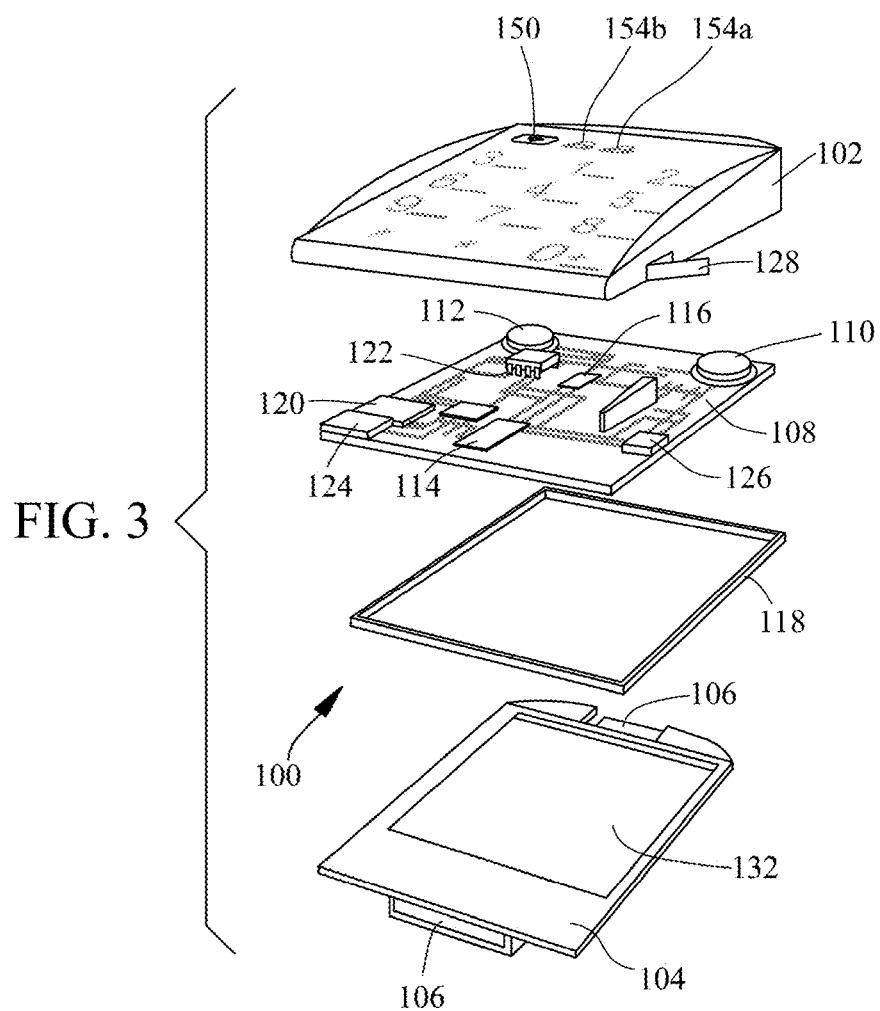
FIG. 3 is an exploded view seen from the top of the retaining fastener in FIG. 1.
Figure 4:
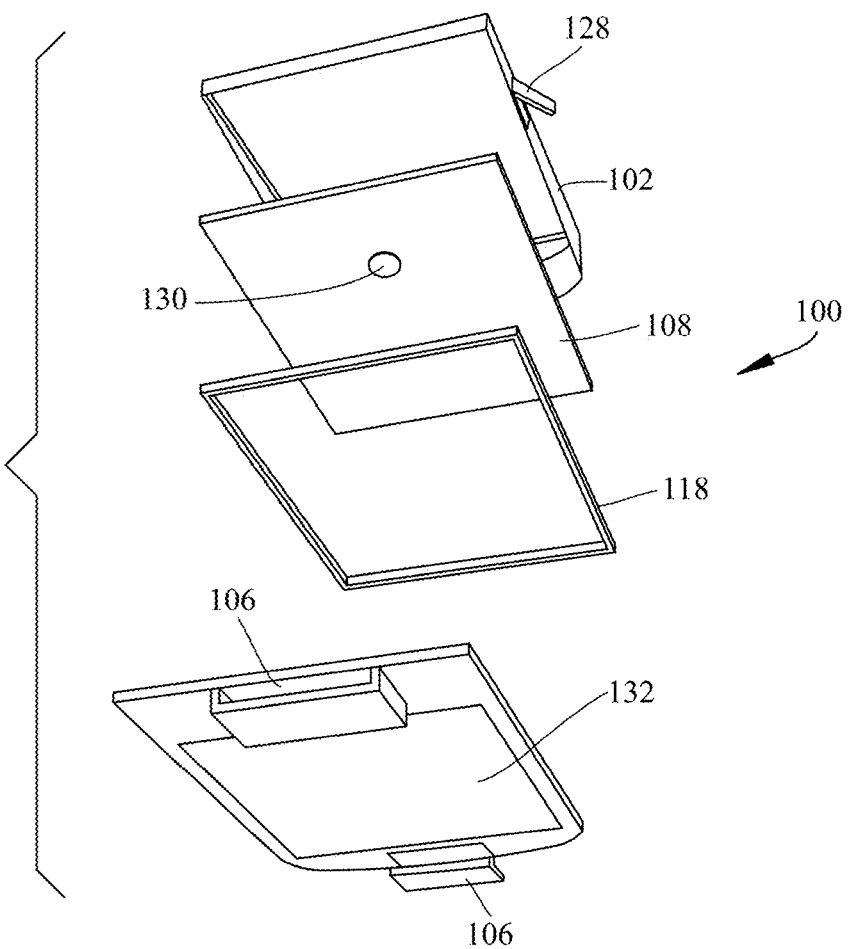
FIG. 4 is an exploded view seen from the bottom of the retaining fastener in FIG. 1.

The interior retaining fastener 100 has an aesthetic design generally similar to that of existing fastener members (not shown in the drawings) that attach to fastening or retaining straps RS found inside most conventional luggage. FIGS. 3 and 4 show the retaining fastener top casing member 102 and a retainer fastener bottom casing member 104, which are secured together to form a housing (see FIGS. 1 and 2). The interior retaining fastener 100 has a connection feature that comprises connection receptacles 106 formed in the bottom casing member 104 (see FIGS. 3 and 4) which accept the conventional releasable fastening clips FS on the retaining straps RS, thus permitting the retaining fastener 100 to discreetly replace an existing retaining fastener member.

The retaining fastener 100 includes a component circuit board 108 that mounts various fastener components within the housing. These components include a photo camera 110 and a top-facing first video camera 112, preferably a low-light wide angle photo camera and an HD video camera with built-in image stabilization, and having embedded date/time stamp and audio recording capabilities. The retaining fastener also contains GPS circuitry 114, a capacitive touch sensor controller 116 that senses when the retaining fastener has been touched by a human, and an on-board antenna 118. The circuit board mounts a SIM card holder 120 and a microcontroller 122. The fastener 100 provides a system for communicating with the zipper pull 200 and a transmission system. Moreover, the retaining fastener contains a power system that includes a battery 124 having an awake and sleep mode, where the sleep mode is the default mode to reduce power consumption and conform with FAA and TSA requirements for inflight electronics. The retaining fastener may contain a USB port 126 to allow for easy recharging of the power system through a USB access opening 128 in the top casing member 102. In a certain embodiment the retaining fastener touch sensor is capable of shifting the retaining fastener power system to the awake mode when the touch sensor detects a human being touching the retaining fastener.

As seen in FIG. 4, which shows the retaining fastener from the bottom, a bottom-facing second video camera 130 mounts on the circuit board 108 and faces toward the contents of the piece of luggage when the retaining fastener is locked and securing the contents of the piece of luggage. This ensures that images of a potential thief will be captured if the retaining fastener were to be flipped upside down from the desired orientation shown in FIG. 2. The video camera 130 points toward a translucent display window 132 carried by the bottom casing member 104. A second photo camera can be provided in addition to or instead of the video camera 130.

In a certain embodiment, the retaining fastener 100 may be lockable to aid in preventing theft of valuables secured by the retaining straps RS, but will also contain a "key hole" 150 accessible by a Transportation Security Administration (TSA) master key code. In such an embodiment the system may contain an indicator, transmission, and/or notification to a user, in a manner known by a person having ordinary skill in the art, to confirm that the master key was used to unlock the retaining fastener. In a preferred embodiment the retaining fastener can include a touch screen key pad 152, known by a person having ordinary skill in the art, for locking and unlocking. Such an embodiment may also utilize "locked" and "unlocked" icons 154a and 154b, respectively, which alternately illuminate, depending on the status of the lock, to indicate to a user the position of the lock. This lock may also be adapted for remote locking and unlocking capabilities in a manner known to a person having ordinary skill in the art.

When the touch sensor 208 of the zipper pull is activated, the zipper pull communicates, preferably wirelessly, with the retaining fastener 100, causing the retaining fastener to shift to the awake mode. The retaining fastener remains in the awake mode for a predetermined length of time. Once in awake mode, the GPS circuitry 114 is activated and the cameras 110, 112, and 130 on the retaining fastener begin recording audio, video and/or a plurality of images, as the case may be. The GPS circuitry automatically transmits the location of the retaining fastener to a database and/or a user's account, after a predetermined time but before the retaining fastener shifts back to sleep mode. The camera recordings are also automatically transmitted, via the transmission system in a manner known by a person having ordinary skill in the art, to a database before the retaining fastener shifts back to sleep mode. In a certain embodiment the information sent to the database is organized based on the specific zipper pull and retaining fastener from which the information was sent. Each zipper pull and retaining fastener may include identifying information in the transmission to associate a particular owner with the audio, video, or still-image information gathered by the retaining fastener. In a certain embodiment, the transmitted information will be sent to a database accessible only by the proper authorities to reduce the risk of vigilante actions and keep the identity of innocent search personnel private. However, the system may provide users with alerts that the system has been activated and information was transmitted. The alerts may be transmitted through a process known to a person having ordinary skill in the art.

In one embodiment, the zipper pull and retaining fastener are linked to a user account and interactive computer software. Upon arrival by the user at his/her destination, the software allows the user to record whether his/her luggage and all belongings are in his/her possession. If the user indicates that no possessions are missing, all transmitted data from the preceding trip is removed from the database. If the user indicates that his/her belongings were not returned, the information will be saved to allow the proper authorities to utilize the information. In other embodiments, the software may ask additional information that could aid authorities in their investigation. Additionally, the user account and interactive software may allow a user to identify several pieces of luggage and respective security systems.

Moreover, the system may allow remote access to the fastening member and the zipper pull using a receiver known to a person having ordinary skill in the art. Remote access will allow a user or the proper authorities to activate either device in the event that one of the devices fails to perform as designed. The user may also have the ability to remotely access the GPS of either device to confirm the location of his/her luggage at any point while the luggage is not in his/her possession. The GPS may use provided Wi-Fi services to transmit the location in a manner known to a person having ordinary skill in the art. Moreover, the GPS may utilize a processor that will enable the unit to operate in challenging GPS environments, such as indoor tracking or when the end-user is on the move. This high level of GPS performance is achieved by using innovative GPS firmware which can detect changes in context, temperature, and satellite signals, and opportunistically update its internal parameters which enables near-continuous navigation by maintaining and opportunistically updating its internal parameters while consuming mere microwatts of battery power.

The touch sensors described herein may utilize any touch sensor technology known to those skilled in the art, including but not limited to pressure and heat sensors. The present invention may use any suitable system known by those skilled in the art, preferably wireless, for communicating between the zipper pull and the retaining fastener. It will also be appreciated that different embodiments may also use any camera, GPS, and power system known to a person having ordinary skill in the art.

Figure 8:
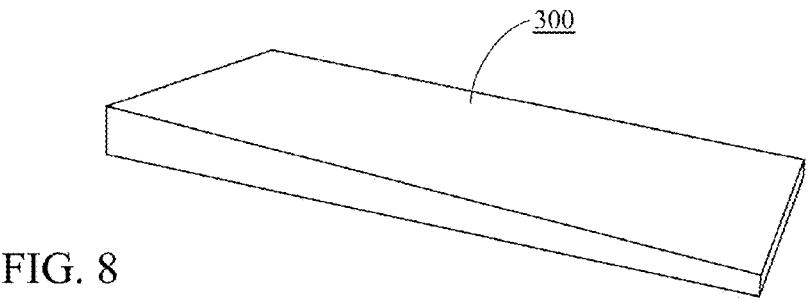
FIG. 8 is a perspective view of a luggage latch member according to an alternate embodiment of the luggage security system.
Figure 9:
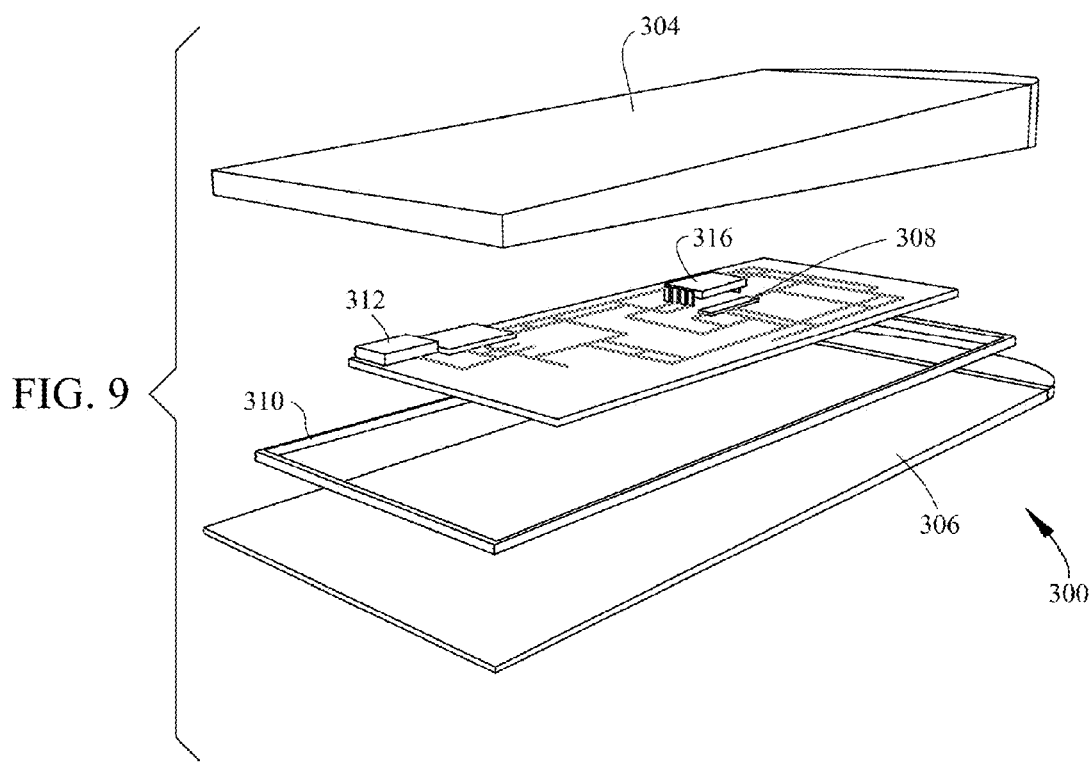
FIG. 9 is an exploded view of the latch member in FIG. 8.

A certain alternate embodiment may instead of the zipper pull device 200 described above use a latch member device 300 like that shown in FIGS. 8 and 9 for luggage having latches instead of zipper closures. The latch member has all of the features of the zipper pull and performs the same functions. FIGS. 8 and 9 use "300" series reference numerals to identify components according to their "200" series counterparts in FIGS. 5 to 7. It will be appreciated, however, that FIGS. 8 and 9 do not depict all of the components required to carry out the functions of the latch member that correspond to functions of the zipper pull device 200. In that regard, a latch member top casing member 304 and lower casing member 306 together form a housing of the latch member 300 as shown in FIG. 8. Within the housing are a touch sensor/controller 308, an antenna 310, a power supply system 312, a microcontroller 316. As noted, these components perform the same functions in the latch member 300 as their counterparts do in the zipper pull device 200. Other like components to those of the zipper pull device 200, such as GPS circuitry, are not explicitly depicted in FIG. 9, but may nevertheless be included in the latch member device 300.

In a certain embodiment the power systems of the zipper pull and retaining fastener may be capable of converting solar or kinetic energy to electric energy using any conversion technique known to a person having ordinary skill in the art. The devices may also notify the user when their respective power supply is low.

Glossary of Claim Terms

Awake Mode: is a power mode providing increased power distribution from sleep mode.

GPS: is a global positioning system.

Latch Member: is any fastener used to close luggage other than a zipper.

Luggage: is any suitcase, bag, or container used to carry or transport personal belongings.

Retaining Fastener: is a device attached to retaining straps typically found in luggage.

Sleep Mode: is a power mode intended to the reduce power distribution rate from the maximum rate.

Zipper Pull: is a device attached to a zipper which provides a user with a handle-like means to aid in opening the zipper.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A security system for detecting entry into an enclosure capable of being transported to different locations and for recording information relating to an individual gaining entry, the security system comprising:
    an exterior member mountable to a closure device that enables access to the interior of the enclosure; and
    an interior member having mounting structure for mounting the interior member within the enclosure, wherein:
    the exterior member includes (i) a touch sensor that is activated when the exterior member is touched by a human, and (ii) exterior member communication circuitry that sends a signal to the interior member when the touch sensor is activated, and
    the interior member includes (i) a power supply, (ii) recording apparatus including at least one of a camera system for capturing images in the vicinity of the interior member and an audio system for recording sounds in the vicinity of the interior member, (iii) interior member communication circuitry for accepting the signal from the exterior member communication circuitry, and (iv) control circuitry for maintaining the interior member power supply in a sleep mode and initiating operation of the recording apparatus when the signal is received from the exterior member.

2. The security system of claim 1, wherein the exterior member mimics the appearance of a conventional device for enabling access to the interior of the enclosure.

3. The security system of claim 1, wherein the camera system includes a video camera facing in a predetermined first direction.

4. The security system of claim 3, wherein the camera system includes a second video camera facing in a second predetermined direction.

5. The security system of claim 1, wherein the camera system includes a still photo camera.

6. The security system of claim 1, wherein the interior member includes circuitry for determining the location of the interior member and transmitting to a remote destination information relating to the location of the interior member.

7. The security system of claim 1, wherein the interior member communication circuitry transmits information recorded by the recording apparatus to a remote destination for storage via Wi-Fi or using a SIM card.

8. The security system of claim 1, wherein the exterior member includes circuitry for determining the location of the exterior member and transmitting to a remote destination information relating to the location of the exterior member.

9. The security system of claim 1, wherein the interior member includes a sensor for activating operation of the recording apparatus when the sensor detects the presence of a human.

10. The security system of claim 1, wherein the enclosure is an item of luggage.

11. A closure member for use with an object having a compartment interior for holding articles and being capable of movement from one location to another, the closure member comprising:
    a housing configured to mimic the appearance of a conventional device movable by a human from a closed state that prevents access to the compartment interior to an open state that enables access to the compartment interior;
    circuitry for generating a location signal indicating the location of the closure member;
    a sensor for generating an activation signal when the housing is touched by a human; and communication circuitry for wirelessly sending the location signal to a remote receiver in response to the activation signal.

12. The closure member of claim 11, wherein the housing includes an attachment device constructed for attaching the closure member to the conventional device.

13. The closure member of claim 11, wherein the object is an item of luggage.

14. A monitoring device for generating visual information relating to an object having a compartment interior for holding articles and being capable of movement from one location to another, wherein the object includes a closure movable by a human from a closed state that prevents access to the compartment interior to an open state that enables access to the compartment interior, the monitoring device comprising:
  a housing;
  a recording apparatus in the housing including a camera system for capturing visual images;
  a power supply in the housing for powering the recording apparatus;
  an attachment including brackets on the housing for releasably engaging mounting structure in the compartment to removably mount the monitoring device in the compartment interior with the recording apparatus oriented for capturing a visual image of the human when the human gains access to the compartment interior by moving the closure to the open position;
  control circuitry in the housing for maintaining the power supply in a sleep mode and enabling operation of the recording apparatus when an activation signal is received wirelessly from a remote device; and
  communication circuitry in the housing for transmitting to a remote storage location visual images captured by the camera system.

15. The monitoring device of claim 14, further comprising circuitry for generating a location signal indicating the location of the monitoring device, wherein the communication circuitry is adapted to transmit the location signal to the remote storage location via at least one of a Wi-Fi connection or a SIM card included in the monitoring device.

16. The monitoring device of claim 14, wherein the camera system includes a video camera facing in a first predetermined direction.

17. The monitoring device of claim 16, wherein the camera system includes a second video camera facing in a second predetermined direction.

18. The monitoring device of claim 14, wherein the camera system includes a still photo camera.

19. The monitoring device of claim 14, wherein the communication circuitry is adapted to transmit the visual images via a Wi-Fi connection or a SIM card to the remote storage location.

20. The monitoring device of claim 14, wherein the communication circuitry is adapted to transmit to the storage location information uniquely identifying the monitoring device.

21. The monitoring device of claim 14, wherein the object is an item of luggage.

22. The security system of claim 1, wherein the exterior member is removably mountable to the closure device.

23. The security system of claim 1, wherein the mounting structure is constructed for removably mounting the interior member within the enclosure.

24. The security system of claim 6, wherein the circuitry for determining the location of the interior member comprises GPS circuitry.

25. The security system of claim 8, wherein the circuitry for determining the location of the exterior member comprises GPS circuitry.

26. The security system of claim 9, wherein the sensor comprises at least one of a touch sensor, a heat sensor, and a pressure sensor.

27. The closure member of claim 12, wherein the attachment device is constructed for removably attaching the closure member to the conventional device.

28. The closure member of claim 13, wherein the conventional device is at least one of a luggage latch and a luggage zipper pull.

29. The closure member of claim 11, wherein the communication circuitry transmits the location signal to a remote destination for storage.

30. The security system of claim 15, wherein the circuitry for generating the location signal comprises GPS circuitry.

31. The monitoring device of claim 14, further comprising a monitoring device sensor for enabling operation of the recording apparatus when the monitoring device sensor detects the presence of a human.

\* \* \* \* \*